United States Patent [19]  
Maldeis et al.

[11] 3,760,933  
[45] Sept. 25, 1973

[54] APPARATUS FOR RAPIDLY COATING SURFACES WITH WET, PARTICULATE MATERIALS

[75] Inventors: Lewis Fritts Maldeis, Hinsdale, Ill.; Aubrey Meredith Shideler, Medina, Ohio

[73] Assignee: Martin Marietta Corporation, New York, N.Y.

[22] Filed: Oct. 18, 1971

[21] Appl. No.: 190,385

Related U.S. Application Data

[62] Division of Ser. No. 813,193, April 3, 1969, Pat. No. 3,653,951.

[52] U.S. Cl. ............. 198/128, 117/105.5, 118/317, 239/662
[51] Int. Cl. ............................................. B44d 1/08
[58] Field of Search ................. 239/662, 668, 672; 117/104 R, 105.5, 169 A, 169 R; 118/317, 323; 198/128, 129; 214/17

[56] References Cited
UNITED STATES PATENTS

| | | | |
|---|---|---|---|
| 2,651,404 | 9/1953 | James | 198/128 |
| 2,920,746 | 1/1960 | Lucas | 198/128 |
| 3,136,405 | 6/1964 | Kulla | 198/128 |
| 3,592,393 | 7/1971 | Sinden | 198/128 X |

Primary Examiner—M. Henson Wood, Jr.
Assistant Examiner—Michael Mar
Attorney—John A. Crowley, Jr. et al.

[57] ABSTRACT

An apparatus for rapidly coating a distant surface with wet, particulate material, which includes thrower means having a high speed endless slinger belt for projecting wet, particulate material at a high rate onto a distant surface; storage means for storing dry, particulate material, and feed metering and mixing means for successively and continuously metering the dry material from the storage means, mixing liquid with the dry material and discharging the resulting wet, particulate material at the high rate onto a selected area of the belt.

A method for coating wet, particulate material onto a distant surface at a high rate including the steps of metering dry, particulate material at a high rate from a storage means, adding a metered amount of liquid to the dry material, mixing the liquid and dry material uniformly together, metering the resulting liquid-material mixture onto a slinger belt and projecting the wet mixture at the high rate as a continuous ribbon onto a distant surface.

11 Claims, 12 Drawing Figures

APPARATUS FOR RAPIDLY COATING SURFACES WITH WET, PARTICULATE MATERIALS

This is a division of application Ser. No. 813,193, filed Apr. 3, 1969, now U.S. Pat. No. 3,653,951.

This invention relates to apparatus and method for rapidly mixing dry particulate materials with a liquid and then applying the resultant mixture onto a distant surface. More particularly, this invention relates to apparatus and method for maintaining metallurgical furnaces in which granular refractory materials are mixed with water and projected at very high rates over considerable distances onto the hot wall surfaces within a metallurgical furnace to provide protective refractory coatings thereon.

Various apparatus and methods are known for applying coatings or layers of loose, dry, powered or granular materials. In one apparatus the materials are dropped from a feed-hopper onto a pulley, are transferred by the pulley to a belt traveling at high velocities and are projected from the belt onto the distant surfaces to be coated. One such apparatus is described in U.S. Pat. No. 1,750,864. These apparatus, however, are not suitable for applying wet particulate materials, especially wet, granular refractories, to a distant surface because the wet materials would tend to clog the outlet of the feed-hopper and/or stick onto the transfer pulley or the high velocity endless belt, thereby causing stoppage of the apparatus and/or non-uniform application of the coating.

Another known apparatus, which is described in U.S. Pat. No. 2,651,404, may be used to project relatively dry, damp granular coating materials, such as cement, from an endless belt traveling at high velocities. In this apparatus, cumbersome and elaborate precautionary measures are taken to facilitate transfer of damp, cementitious material onto the endless belt used for projecting the material. The cementitious material is first dumped with water into a mixing hopper, mixed with the water in a batch-type operation by a paddle mixer located in the bottom of the hopper, discharged through a gate controlled outlet and then deposited onto a relatively slow moving endless conveyor belt arranged beneath the hopper outlet. At the end of the conveyor belt adjacent to the outlet, a flanged roller is provided for shaping the deposited damp material into an even mount of suitably uniform density. At the other end of the belt, a plurality of parallel rotatable discs are positioned so that upon rotation, they will tned to break up the mound and to cause it to fall freely and uniformly into a blight formed by an endless belt traveling at high velocities and a roller positioned over the endless belt. In the batch-type mixing of this apparatus, the cementitious material would tend to stick to the sides of the hopper to the to clog the gate controlled outlet and thus would not insure a uniform supply of mixed damp materials to the conveyor belt. the slurry-like Moreover, the additional disadvantages of this apparatus are the requirement of elaborate and cumbersome devices for slowly transferring the damp material from the outlet of the hopper to the high velocity endless belt, and the need for considerable space in which to operate. Therefore it does not have suitable maneuverability for use in confined areas such as those surrounding metallurgical furnaces. Another significant disadvantage is that this apparatus is restricted to handling of relatively dry materials (i.e. materials dampened only sufficiently to effect hydration of the cementitious materials) which are capable of being shaped on the conveyor belt in order to provide some uniformity in the coating.

Currently in the maintenance of metallurgical furnaces such as basic oxygen furnaces, it is common practice to use gunning devices for spraying fluid aqueous slurry-type refractory masses onto the linings or wall surfaces within the furnaces. These devices, as exemplified by that disclosed in U.S. Pat. No. 3,351,289, usually employ a slender pipe-like member through which the slurry is pumped to a spray nozzle at its forward end. The nozzle can be positioned within the furnace close to the furnace surfaces to be covered with the refractory mass. These devices suffer from a number of disadvantages. In order to withstand the high temperatures within the furnace they are necessarily made of highly heat-resistant materials, usually metal alloys, and are provided with means for cooling the pipe-like member and/or the support structures used for positioning the member in the furnace. Another significant disadvantage of these gunning devices is the requirement of elaborate heavy mobile support units which must be moved on the floor adjacent to furnace to position the spray nozzle within the furnace close to the walls and which must subsequently be moved away from the furnace during the steelmaking operation. Consequently, considerable time is taken up positioning and moving the gunning devices either prior to or after the gunning operation.

Still another disadvantage of these gunning devices is that the siurry-like mass of refractory must be sufficiently fluid to be pumped through the pipe-like member and sprayed by the nozzle, i.e. the mass must have a water content of at least about 25 percent and usually 40 percent or more by weight. With the known gunning devices this necessitates the application of a number of relatively thin refractory coatings of the fluid mass at low rates of application, based on the dry solids content of the fluid slurry.

Advantageously this invention provides an apparatus and method which are capable of applying refractory materials at very high rates, e.g. from about 500 to about 2,000 or more pounds per minute (based on the dry weight), without the problems encountered by the known apparatus and methods.

Thus this invention contemplates an apparatus for rapidly coating a distant surface with wet, particulate material which comprises thrower means having a high speed endless belt for projecting wet, particulate material at a high rate and in the form of a continuous ribbon onto a distant surface, storage means for storing dry particulate material, and feed metering and mixing means for successively and continuously metering the dry material from the storage means, mixing a predetermined amount of liquid with the metered dry material to form wet, particulate material, and for discharging the wet material at the high rate onto a selected area of the endless belt.

More particularly, this invention is directed to a highly maneuverable and transportable apparatus for applying wet granular refractory material, especially material that contains less than 25 percent by weight of water, at high rates to the hot lining of a metallurgical furnace, e.g., a basic oxygen furnace, while the furnace is at its operating temperatures, comprising an integral unit consisting of a pallet-like frame, thrower means supported by the frame, the thrower means having an endless slinger belt capable of traveling at high speeds and of projecting wet granular material deposited thereon for long distances at the high rates, a feed hopper for storing dry granular refractory material, a vertically extending screw conveyor for removing metered amounts of dry granular refractory material from the feed hopper, the loading end of the conveyor being positioned in the botom of the feed hopper and the discharge end of the conveyor being positioned immediately above the endless belt, injector means for injecting water into the dry material within the screw conveyor at a predetermined distance above the discharge end of the conveyor, and mixing means in the conveyor for mixing the water and the dry refractory material during rotation of the conveyor to form a uniform mixture of wet refractory material which is metered from the discharge end of the conveyor onto the endless belt at the high rates, the screw conveyor and the hopper also being supported by the frame whereby said apparatus can be readily transported and positioned as a unit in front of an opening in the wall of a metallurgical furnace to project wet refractory material through the opening onto the lining of the furnace.

In accordance with this invention dry bulk-type, particulate materials, which become sticky and tend to conglomerate into larger particles when they are wet with a liquid, e.g. water, can be metered from a storage means at a high rate, mixed with a predetermined amount of liquid, i.e., usually not more than about 50 percent by weight of the dry material, metered as wet, particulate material onto a thrower-type belt and then projected or thrown at the high rate onto a distant surface to provide a uniform coating thereon.

Moreover, the apparatus of the invention provides an integral unit that is especially suitable for applying granular refractory materials to surfaces which are relatively inaccessible and which may be heated to temperatures in excess of about 3400°F.

The means used by the invention for storing dry, particulate material may comprise one or more hoppers arranged side by side or one above another and arranged with a common outlet. A main storage hopper may be located a considerable distance away from an auxiliary feed hopper that is positioned adjacent to the feed metering and mixing means of the invention, and a chute or other feed arrangement may be provided for conveying the dry materials to the auxiliary hopper.

One particularly effective storage arrangement is obtained by using two different size hoppers, the larger being detachable and the smaller being integrally secured to the apparatus. In this embodiment the detachable hopper has an outlet that can be closed by a valve so that it can be filled with dry material at one location, transported to site of the apparatus, and then mounted on the apparatus to discharge into the smaller feed hopper.

The feed metering and mixing means or unit used by this invention is especially important for obtaining the desired high rates of transfer and application to a distant surface. This unit must be capable of continuously and successively withdrawing or metering dry particulate material from the storage means at a high rate, i.e., at least 500 pounds per minute, mixing the dry material with a liquid, preferably water, while maintaining the high rate of withdrawal, and then metering or transferring the resulting wet, particulate material at the high rate onto a selected area of the endless belt so that the wet material can then be projected at the high rate onto the surface to be coated.

In accordance with the invention, the feed metering and mixing means includes a screw conveyor, an injector device for injecting liguid into the conveyor and mixing elements or means positioned in the conveyor for mixing the liquid and dry material. The conveyor extends from the storage means to the thrower unit and has a conveyor screw that rotates within a shroud or casing. It is particularly important that the mixing elements or means be arranged to mix the liquid immediately with the dry material as the liquid enters the shroud. This arrangement provides a uniform mixture as the material is metered at a high rate through the shroud.

The screw conveyor advantageously extends on an incline and preferably in a substantially vertical position to obtain the additional benefit of gravity feed of the metered materials. Also this positioning helps to insure uniform mixing of the dry, particualte material and the liquid. In addition, a particularly effective arrangement for enhancing the maneuverability and transportability of the apparatus is provided by using a substantially vertical screw conveyor and a feed hopper mounted directly above the conveyor.

The injector device or means for injecting liquid into the particulate material passing through the shroud may comprise a plurality of nozzles that extend through the wall of the shroud at spaced intervals around its periphery. In an alternate embodiment the injector comprises a plurality of nozzles positioned on a hollow shaft of the conveyor screw so that liquid can be introduced axially through the shaft into the nozzles and then injected into the particulate material.

Mixing of liquid and particulate materials may be effected by paddle-like elements or members secured to the shaft of the screw conveyor or mixing may be provided by the nozzles which are secured to the hollow shaft and which extend out into the path of the particulate material. Also, other paddle-like mixing members may be secured at different positions on the flighting of the screw conveyor. It will be understood that the means for mixing the materials is only provided within a particular mixing zone of the screw conveyor and that this mixing zone is selected so that a metered amount of dry particulate material and liquid are completely and uniformly mixed before they are discharged onto the high speed endless slinger belt.

The thrower unit or means of the invention has a high speed endless slinger belt with a carrying surface that is curved in an abrupt manner to cause materials deposited thereon to be projected in a continuous, solid-like, arcuate ribbon.

The endless belt, which is in the form of a loop, may be trained or positioned on two or more rollers or pulleys, one of which acts as a drive roller. Usually the belt is tracked over a rear driver roller and a forward idler roll, axes of which are parallel to each other. A pair of hold-down discs or wheels are positioned to engage the carrying surface of the belt and to shape it in the form of a concave curve. Particulate materials deposited on a selected area of the belt are initially passed between the hold-down discs then projected from the belt. The trajectory of the ribbon of materials projected from the belt is adjusted by raising or lowering the idler roll with respect to the hold-down discs. It will be understood that the angular position of the endless belt with respect to a horizontal plane (as it travels from the hold-down discs to the front idler roll) not only determines the trajectory of the material but also influences the distances the materials are projected. Thus the idler roll can be positioned to project the material a maximum distance, based on the speed of the belt and the material being projected. In general, the angular position of the belt may be varied from about 20° to 50° with respect to the horizontal, and maximum projection is usually found to occur at an angle of about 30°.

The hold-down discs or rollers are spaced inwardly from the outer edge of the belt, the space between the discs being determined to a large measure by the actual width of the belt, which may vary from 5 to 24 inches in width. In accordance with this invention, the endless slinger belt is operated at speeds from about 1000 to 4000 feet per minute and is capable of slinging or throwing wet material at distances of 50 feet or more in the form of a long, continuous ribbon. It will be appreciated that in the maintenance and repair of metallurgical furnaces it is particularly advantageous to employ a thrower means which will form a ribbon of closely compacted material that can be projected onto a particular area on the furnace wall.

In accordance with this invention, it has been found that the fall-out of the material from the continuously projected ribbon can be reduced to an acceptable minimum by directing the wet material onto a selected zone or area of the carrying surface of the endless belt. This area is roughly shaped like a rectangle, two parallel sides of which are defined by the spacing between the hold-down discs and the other two parallel sides being defined by the tangential lines of contact of the drive pulley and of the hold-down discs with the belt. By maintaining or directing the wet, particulate material onto this area, it is insured that the material will receive sufficient projecting force to be thrown the desired distance from the apparatus. Advantageously, the apparatus of this invention employs a distributing hood which is located on the discharge end of the shroud to direct the wet, particulate material so that it discharges or falls onto the belt in this selected area.

The apparatus of the invention is also preferably provided with a pallel-like frame so that it can be easily maneuvered and readily transported close to an opening in the wall of a metallurgical furnace or close to other openings through which the wet, particulate material is to be projected. Advantageously the thrower unit is supported by a pair of vertically positioned support members which are secured to a turntable or a circular rotatable member mounted on the pallet-like frame, and the screw conveyor and the feed hopper are secured to the vertical supports to provide a transportable integral unit. This unit may be transported by various self-propelled carriers, such as a fork-like truck, an overhead crane assembly, etc., or directly mounted on wheels.

This invention is also concerned with a method of rapidly coating wet, particulate material onto a distant surface, which comprises metering dry, particulate material at a high rate of withdrawal from a storage means, adding a metered amount of liquid to the material while maintaining said high rate of withdrawal, mixing the liquid and dry material to uniformly blend the liquid and material, metering the liquid-material mixture onto a high speed slinger belt at said high rate, and projecting the wet mixture at said high rate as a continuous ribbon onto the surface to be coated.

The particulate materials which may be applied as wet coatings by the apparatus and method of this invention are substantially water-insoluble materials having particle sizes varying from about 325 mesh up to about 2 inches in diameter. Exemplary of these dry materials are sand, cementitious materials, lime, prepared and natural refractory materials such as magnesite, magnesite-chrome, magnesite-dolomite, dolomitic lime, chromite, and the like, and other materials which may be mixed with the refractories including alumina, silicon carbide, zircon, calcined clays, bauxitic materials, and the like. It will be appreciated that the refractory materials may be dead burned or fused. Also refractory mixes of one or more refractory materials containing a number of additives well known in the refractory art such as binders, suspension aids, asbestos fillers, dispersing agents, plasticizers, and the like may be used. It will be understood that such dry particulate materials may contain bound water, i.e. chemically bound water of hydration and/or adsorbed water. For example, refractory mixes may contain from about 2 to 10 percent by weight of a binder e.g. sodium silicate, ball clay, and the like, having from about 0.5 to about 2 percent by weight of adsorbed water and higher amounts of chemically bound water.

Water is the liquid preferably used to prepare the wet, particulate materials. However, other liquids including aqueous suspensions or solutions of a suspension agent, such as colloidal fire clay, or of an organic suspender such as carboxy-methyl cellulose, aqueous dispersions of a dispensing agent such as the metal salts of amyl sulphonic acid, sulphonated petroleum products and/or salts thereof may be employed.

In accordance with this invention, the water content (excluding bound water) of the mixture of water and particulate materials that is applied to a distant surface, may vary from as low as about 0.5 to about 40 percent by weight of the total mixture. In the application of wet, granular refractory material to a furnace lining this water content preferably is less than about 25 percent and usually varies from about 5 to 20 percent by weight of the applied material.

It will thus be understood that one of the significant advantages of this invention is that the apparatus and method can prepare and apply damp or wet particulate materials having a water content that varies over a wide range at the application site by making simple and quick adjustments without any substantial alteration of the apparatus or substantial departure from the steps of the method.

It will also be recognized that another advantage of the apparatus and method of this invention is that very high rates of wet, particulate material, especially refractory materials, can be applied, i.e., from about 500 to 3000 pounds per minute based on the weight of the dry refractory material, in contrast with the relatively low rates obtained by the known gunning devices, i.e., rates on the order of 50 to 300 pounds per minute, based on the weight of the dry refractory material.

Furthermore it will be appreciated that the apparatus and method of this invention can be used in many different coating applications where wet, particulate materials should be applied at high rates. Examplary of these uses are the coating of cementitious materials onto concrete walls, metal pipes, or the like structures;

the application of wet lime and other similar argricultural additives to the soil and the application of wet, granular refractory materials to construct, repair or maintain the walls and linings of furnaces, especially metallurgical furnaces, such as an open hearth furnace, a basic oxygen furnace, an electric furnace and the like.

The apparatus and method of this invention will be further described with reference to the accompanying drawings, in which:

FIG. 12 shows the apparatus of the invention mounted on a fork-lift truck being used to apply wet refractories to the lining of a basic oxygen furnace.

Figure 1:
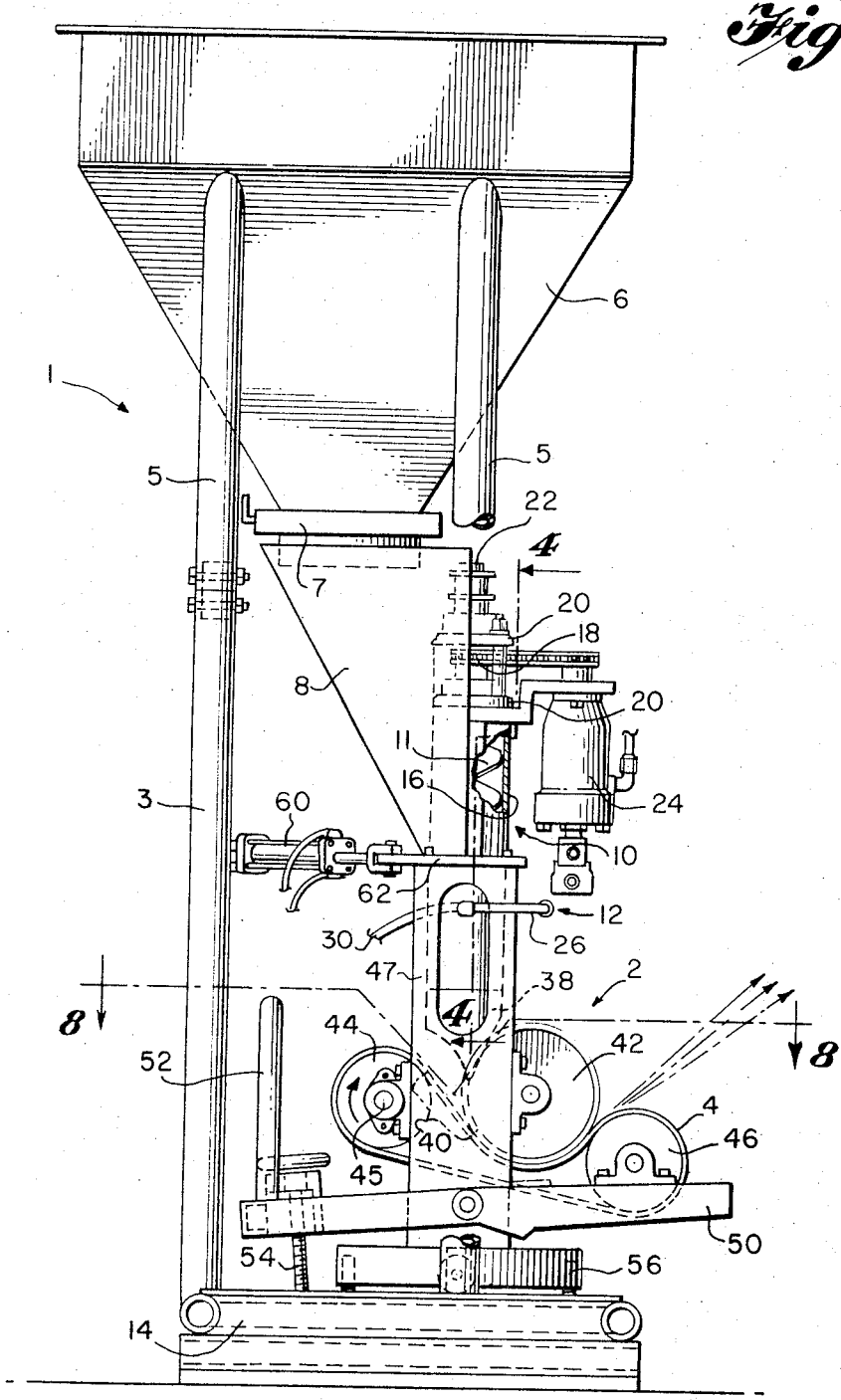
FIG. 1 shows a side elevation of the apparatus of the invention with an outer portion of the shroud of the screw conveyor broken away.

In FIG. 1, the apparatus of the invention is generally designated by the reference numeral 1. As shown, the apparatus is provided with a thrower unit or means 2 having an endless slinger belt 4 for projecting wet particulate material, e.g., granular refractories, onto a distant surface; storage means including the hoppers 6 and 8, for storing the dry particulate material; and feed metering and mixing means, including a screw conveyor 10 and a water injector device 12, for force feeding metered amounts of the dry particulate material from the storage means, for mixing the material with a liquid, and for discharging a metered amount of the wet material onto the endless belt 4.

The storage means of the apparatus includes a hopper 6 that is detachably supported on four tubular support members 3, two of which are shown in FIG. 1. These support members are integrally secured to a pallet-like lower rectangular frame member 14. The detachably supported hopper is provided with four tubular support struts 5, two of which are shown in FIG. 1, that are aligned with and secured to the support members 3 by bolts or other suitable fastening devices. The outlet of the detachable hopper is provided with an iris valve 7. This arrangement allows the detachable hopper to be filled with the dry refractories at one location, transported, and then mounted on the frame of the apparatus prior to the coating operation. It will be appreciated that other suitable hopper devices may be employed for storage and that the hopper disclosed is merely exemplary of one embodiment of a detachable hopper that has been found to be particularly suitable for enhancing the maneuverability and portability of the apparatus.

Immediately subjacent to the outlet of the iris valve 7 is the feed supply hopper 8. This hopper is in the form of a hollow half section of a circular cone, having one vertical wall and a curved sidewall angularly positioned with respect to the outlet of the detachable hopper so that the particulate materials discharged through the iris valve will gravitate to the bottom of the feed hopper. The bottom portion of the feed hopper is provided with a discharge opening for feeding the particulate material into the motor-driven screw conveyor 10 which is part of the feed metering and mixing means of the apparatus.

As shown in the partially broken away section in FIG. 1, the screw conveyor has a conveyor screw 11 positioned within a cylindrical shroud 16. The screw conveyor is loaded with dry particulate material from the bottom of the feed hopper. The upper portion of the cylindrical shroud is cut away to form a half cylinder, the vertical edges of which are welded to the vertical wall of the feed hopper on each side of the upper portion of the discharge opening. The horizontal peripheral edge of the shroud below the half cylinder is also secured by welding to the bottom of the discharge opening. In this manner, the shroud surrounds the discharge opening of the hopper. As more clearly shown in FIG. 2, the center of the vertical wall of the feed hopper has a rectangular groove that extends down a portion of the wall to provide space for the upper portion of the screw conveyor. With this arrangement, the upper portion of the conveyor screw is positioned within the discharge opening of the feed hopper. Also the shroud 16 extends downwardly and terminates directly above the endless slinger belt 4.

The rotable conveyor screw is positioned in the shroud so that it extends from the lower portion of the feed hopper to the end of the shroud. With this arrangement, the particulate material is confined during its forced travel through the shroud between the conveyor screw and the wall of the shroud to insure accurate metering of the material.

The conveyor screw is supported and aligned by a sprocket member 18 and a pair of self-aligning flange bearings 20. The bearings are mounted on a support that is integral with the frame of the apparatus. The sprocket member has a collar that fits over the shaft 22 of the conveyor screw and is secured thereto between the two bearings 20 for supporting and taking up the thrust of the screw during operation of the apparatus. It will be appreciated that this support arrangement does not require the use of an alignment member at the lower end of the conveyor screw, and thus provides an unobstructed flow path for the metered discharge of the wet mixture of liquid and particulate material from the screw conveyor.

The sprocket member is chain driven by a variable speed hydraulic motor 24. Hydraulic fluid for driving the motor is passed through flexible conduits and is controlled by the operator of the apparatus through appropriate valve controls. These controls usually include an on-off valve and a valve for regulating the feed rate of the screw conveyor so that the feed rate can be preset for a particular coating operation. As shown in FIG. 12, the valve controls for actuating the hydraulic motor may be mounted on a control panel positioned on a fork-lift truck, which may serve as a hydraulic power source and act as a mobile support to facilitate positioning and aiming of the apparatus.

Figure 4:
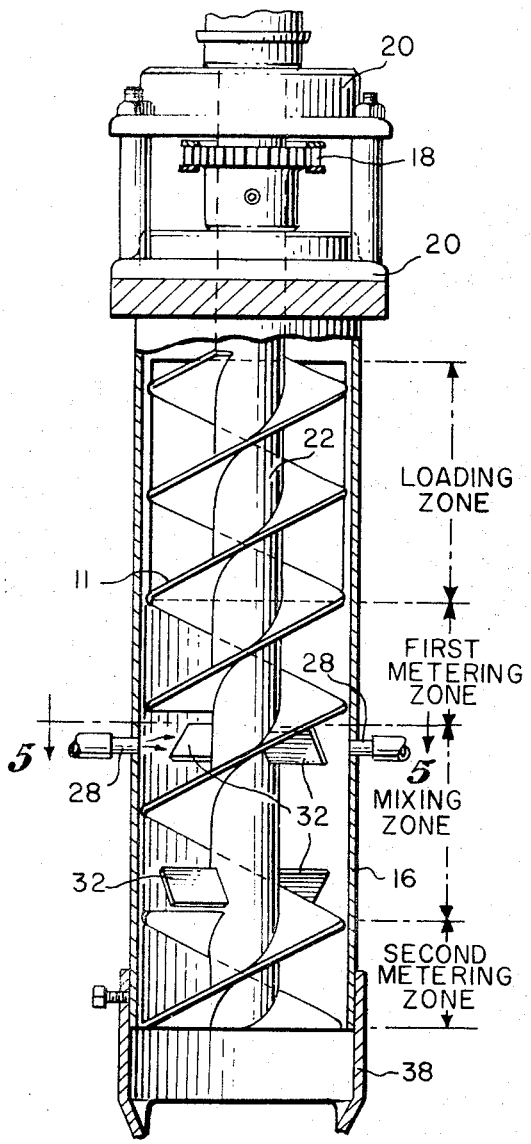
FIG. 4 shows an enlarged view of one embodiment of the feed metering and mixing means of this invention, with an outer portion of the screw conveyor broken away.
Figure 6:
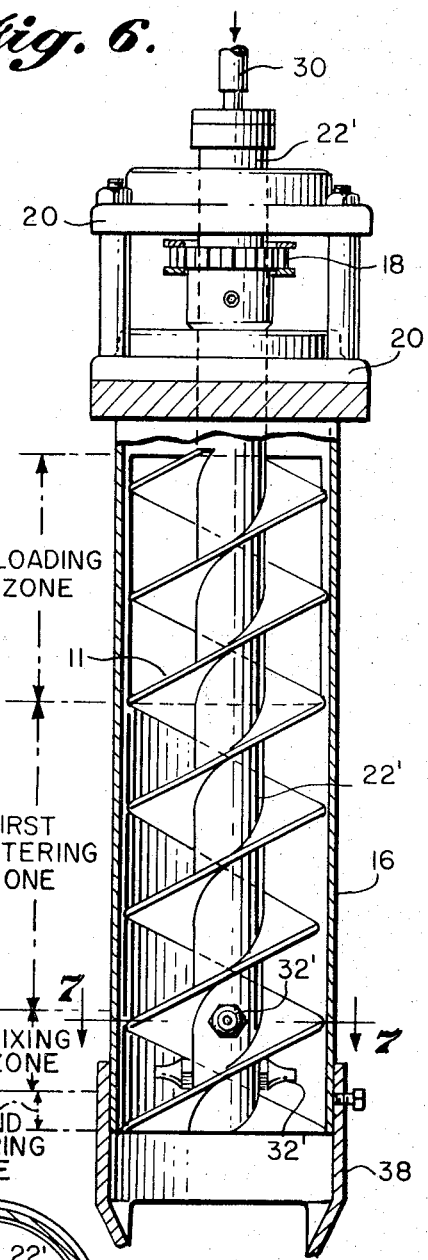
FIG. 6 shows an enlarged view of another embodiment of the feed metering and mixing means of the invention with an outer portion of the screw conveyor broken away.

In accordance with this invention, the feed metering the mixing means of the invention, as illustrated in FIGS. 4 and 6, has a loading zone, a first metering zone, a mixing zone, and a second metering zone which are successively arranged to insure high rates of delivery and uniform distribution of uniformly wet particulate material onto the endless slinger belt 4.

In the loading zone dry particulate materials, such as granular refractories, are taken from the bottom of the feed hopper by the conveyor screw and conveyed downwardly through the shroud.

In the next successive zone, i.e., the first metering zone, the dry particulate material is compacted between the flighting of the screw conveyor and the shroud so that a metered amount of the dry material is forced as a downwardly spiralling continuous ribbon or stream.

At the start of the mixing zone, and at a measured distance from the discharge end of the screw conveyor, means are provided for injecting liquid, e.g. water, into the helical space or zone defined between the conveyor screw and the cylindrical wall of the shroud. One embodiment of this injection means is shown in FIG. 1 and is designated by reference numeral 12. This embodiment comprises a distributor manifold 26 ad three nozzles 28 positioned at 90° to each other around the sides and the front of the shroud wall. Water is introduced into the manifold via a flexible conduit 30, which, as shown in FIG. 12, may be controlled by a valve located on the control panel of the fork-lift truck. Usually a flow meter is positioned adjacent to this valve so that the operator can readily control the rate of water injection.

As shown in FIG. 4, the location of the water injector device 21 is so selected that the water injected will be thoroughly and uniformly mixed with the dry particulate materials before the wet materials are discharged from the end of the shroud. It has also been found that the point of water injection should be spaced from the discharge opening of the feed hopper by a distance such that the conveyor screw and compacted dry material form a seal that will prevent the water from backing up and entering into the bottom portion of the hoppper. In the embodiment shown in FIG. 4, this distance is equal to one-half the length of the flight of the double flighted conveyor screw. It will be understood that this distance will vary depending on the type of flighting used on the conveyor screw and that it is equal to the product of the length of a flight and the reciprocal of the number of flights positioned on the shaft, e.g., the distance equals the length of one flight on a single flighted screw.

If water should enter the bottom of the hopper, there is a tendency for the dry particulate material to conglomerate and to clog the discharge opening and thereby prevent or obstruct effective feeding of materials to the top of the screw conveyor. It will be appreciated that means other than the flighting of the conveyor screw may be employed to prevent the water from flowing upwardly in the shroud into the hopper. However, the arrangement illustrated provides a particularly simple and effective means for avoiding premature mixing of the water and dry materials.

Advantageously, the screw flighting in the first metering zone which prevents entry of water into the bottom of the feed hopper also insures that the required amount of the dry particulate material is delivered at the desired high rate. It will be appreciated that the rate of delivery of the screw conveyor is determined by the speed of rotation of the conveyor screw, the inside diameter of the shroud, and the pitch and number of screw flights used. In accordance with this invention, the conveyor screw is rotated at speeds capable of transferring from 500 to 2000 or more pounds of dry material per minute. For example, a screw conveyor with a 6-inch standard pitch mixed single and double flight conveyor screw, as illustrated in FIG. 4, will operate at speeds of from about 50 rpm to about 400 rpm.

It will be appreciated that the flighting of the screw used in the screw conveyor may be selected from various types which are well known in the conveyor art. The conveyor screw may have a single flight with a standard pitch, a long pitch, a short pitch, or a variable pitch, or it may have a double flight with a standard, long or short pitch. Also, in some instances tapered, single or double flight conveyor screws may be used. As illustrated in FIGS. 4 and 6, particularly effective conveyor screws for the purposes of this invention are those which have a double flight and a standard pitch, in that they promote a smooth uniform flow and discharge of the wet, particulate materials. Moreover, in some cases the conveyor screw may have single flighting in one area and double flighting in others. In accordance with this invention it has been found that a particularly effective embodiment of the conveyor screw is provided when double flighting is used to convey the particulate materials in the loading and metering zones and when a single flighting and additional mixing means are used to convey and to mix the water and particulate material in the mixing zone.

Figure 5:
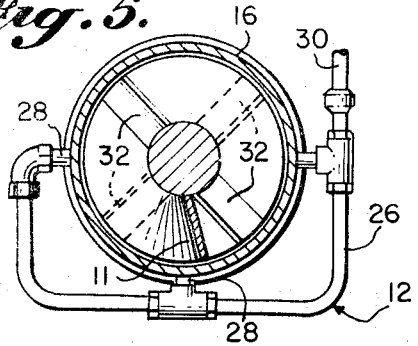
FIG. 5 shows a cross-section of the embodiment shown in FIG. 4 taken along line 5—5.

In the embodiment of the apparatus shown in FIGS. 4 and 5, at the point where the water is injected into the shroud of the screw conveyor, one of the flights of a double flight screw has been removed and the shaft of the conveyor screw provided with means for mixing the water and dry material as they are forced downwardly between the flighting of the screw. The embodiment of the mixing means shown in FIG. 4 consists of two pairs of paddle-like members 32 that are positioned vertically on the shaft at about 90° from each other. Each of these members is also positioned at about 90° to the pitch of the flighting on screw 11 to provide maximum mixing.

The second metering zone, provided by the flighting of the conveyor screw 11 and the shroud wall immediately after the mixing zone, further compacts the stream of wet particulate material exiting from the mixing zone, and thereby causes the formation of a continuous spiralling stream of wet material. Advantageously, the flighting of the conveyor screw and the compacted wet particulate material in this metering zone act to prevent escape of water downwardly from the mixing zone until it is uniformly mixed with the particulate material.

Figure 7:
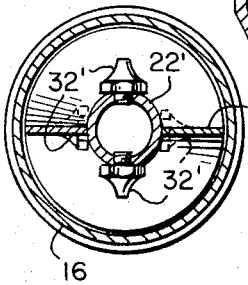
FIG. 7 shows a cross-section of the embodiment shown in FIG. 6, taken along line 7—7.
Figure 8:
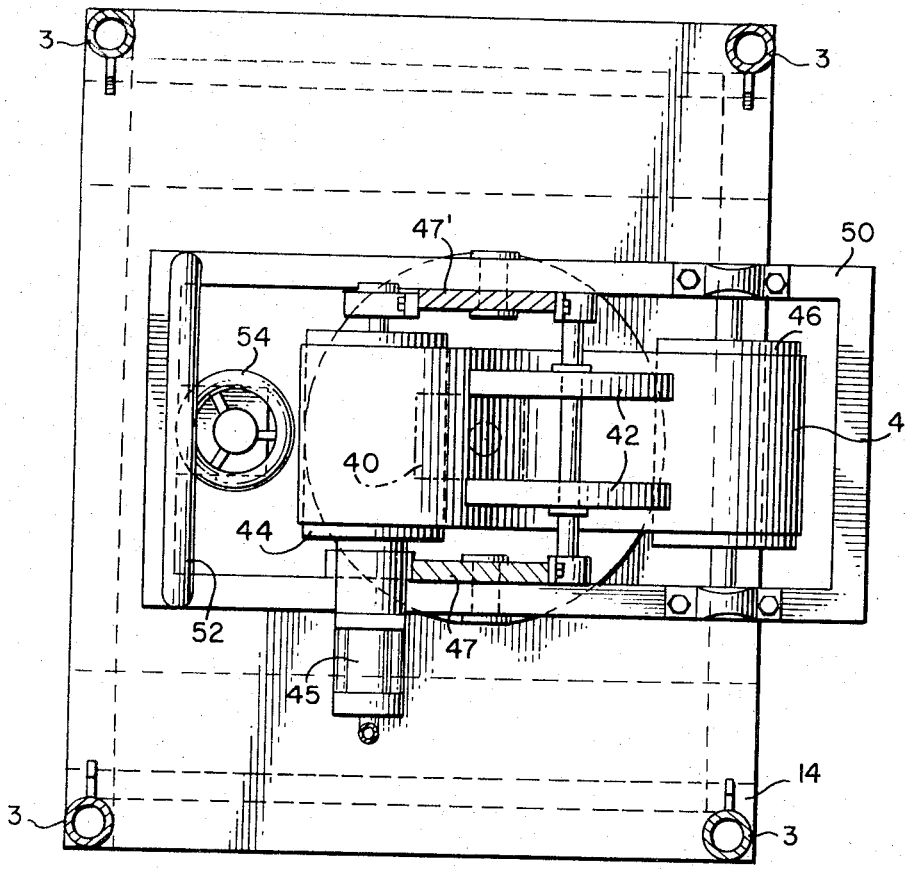
FIG. 8 shows a plan view, partly in section, of the thrower unit of the invention taken along line 8—8 of FIG. 1.

In the embodiment of the apparatus shown in FIG. 6 and 7 another means is provided for injecting water into the shroud and for mixing it with the dry materials, like reference numerals designating like elements. In this embodiment water is passed via a flexible conduit and a rotatable coupling through a tubular shaft 22' and is injected into the mixing zone by a plurality of nozzles 32' provided along the shaft. These nozzles extend out from the shaft into the passing stream of particulate refractory material so that upon rotation of the conveyor screw the nozzles also serve to mix the water with the refractory materials. Two pairs of the nozzles are positioned vertically along the shaft and are arranged, as shown in FIG. 7, at about 90° to each other. In other aspects, this embodiment of the feed metering and mixing means is similar to that shown in FIGS. 4 and 5.

In this embodiment, the mixing zone has been reduced in size and positioned closer to the discharge end of the shroud. Thus it will be appreciated that use of this embodiment facilitates the use of a shorter screw conveyor if so desired.

Again referring to FIGS. 1 and 2, it will be seen that the wet particulate material discharged from the end of the shroud is directed by a distributing hood 38 onto a selected zone 40 of the traveling endless belt. This zone or area is selected so that the wet materials deposited onto the belt will be accelerated and reach their projecting velocity as quickly as possible and thus be projected the required distances, e.g., distances of from 30 to 60 feet may be required in the coating of the linings of open hearth furnaces, basic oxygen furnaces or other metallurgical furnaces.

Figure 2:
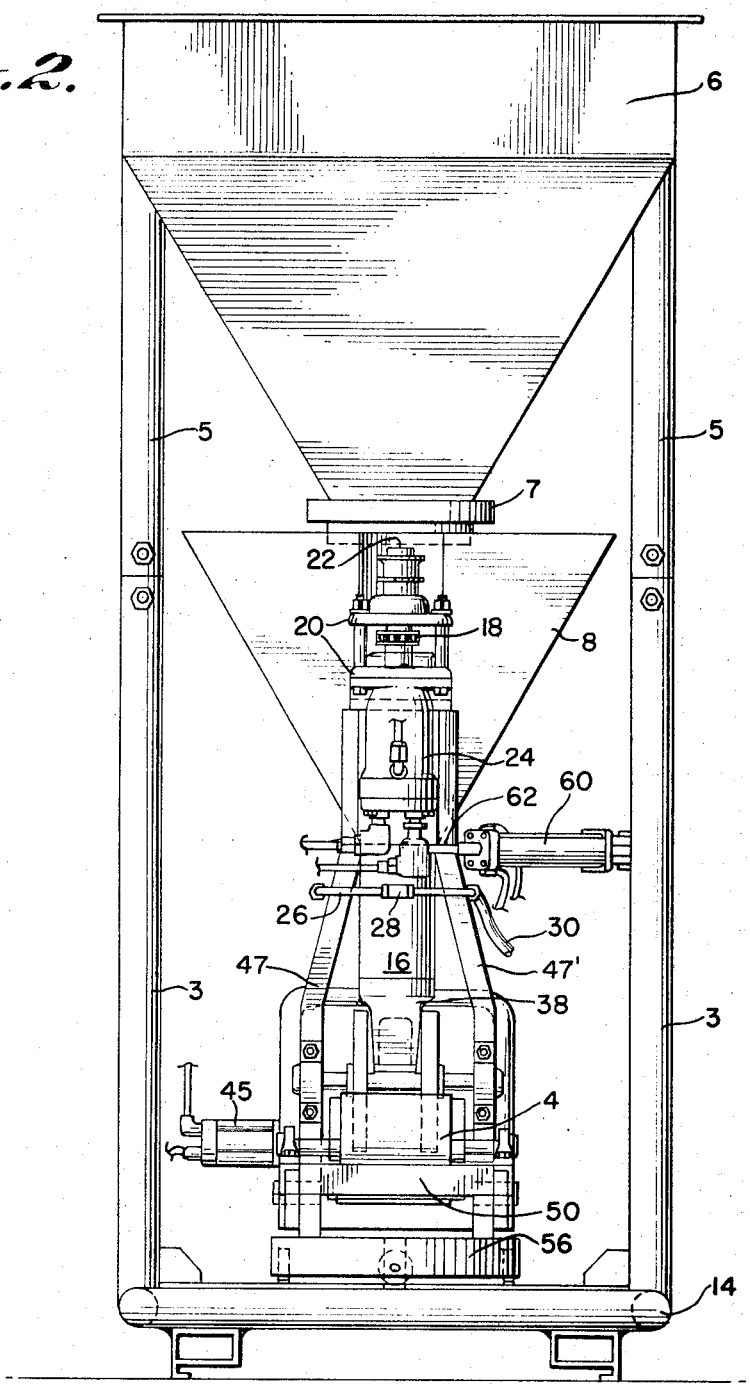
FIG. 2 shows a front elevation of the apparatus.
Figure 3:
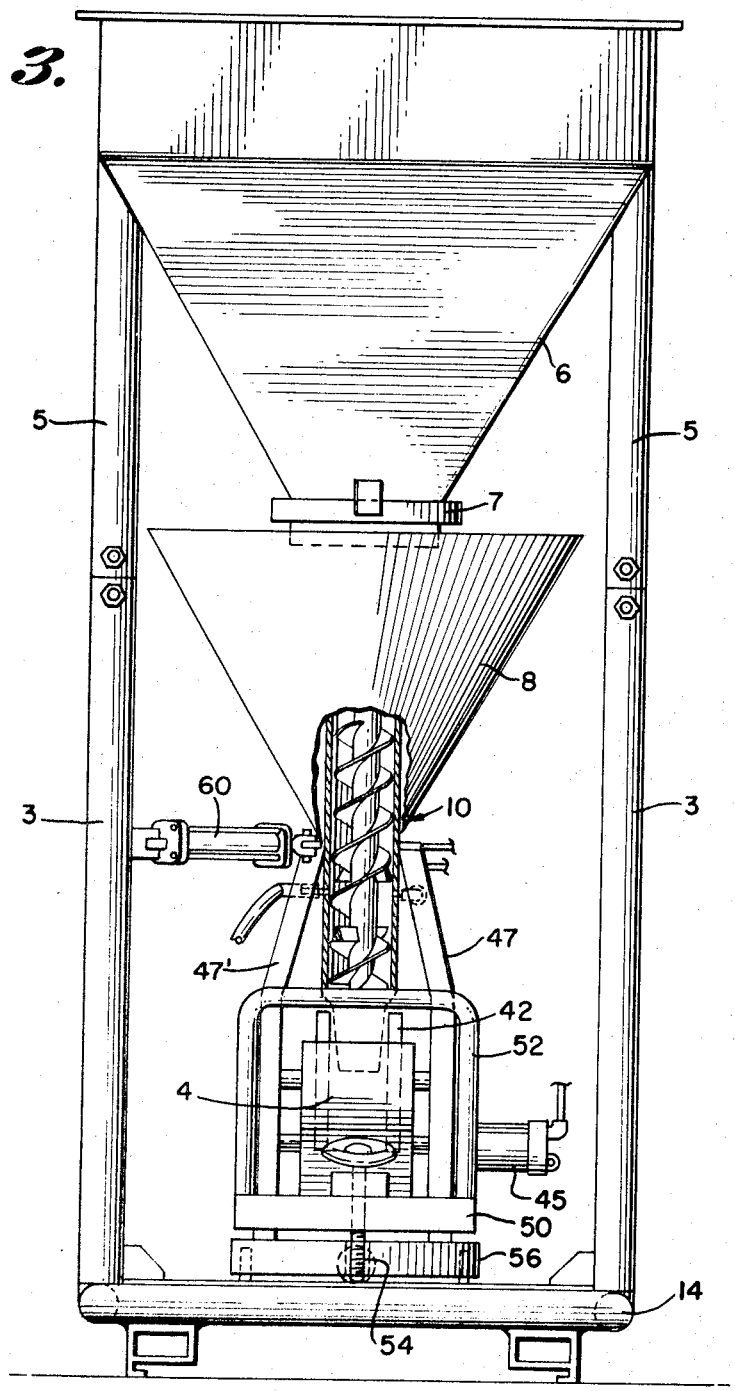
FIG. 3 shows a rear elevation of the apparatus, with an outer portion of the screw conveyor broken away.
Figure 9:
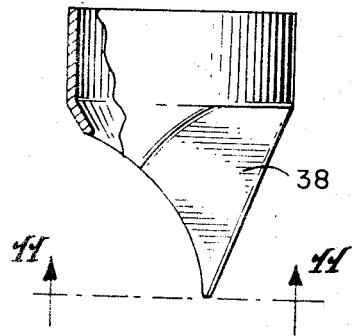
FIG. 9, 10 and 11 are, respectively, side, front and plan views of the distributing hood of the invention.
Figure 10:
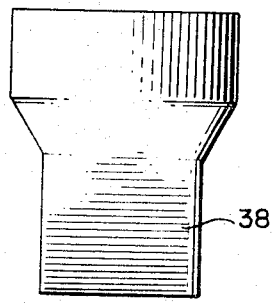
Figure 11:
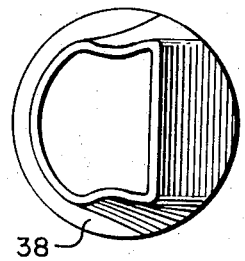
Figure 42:
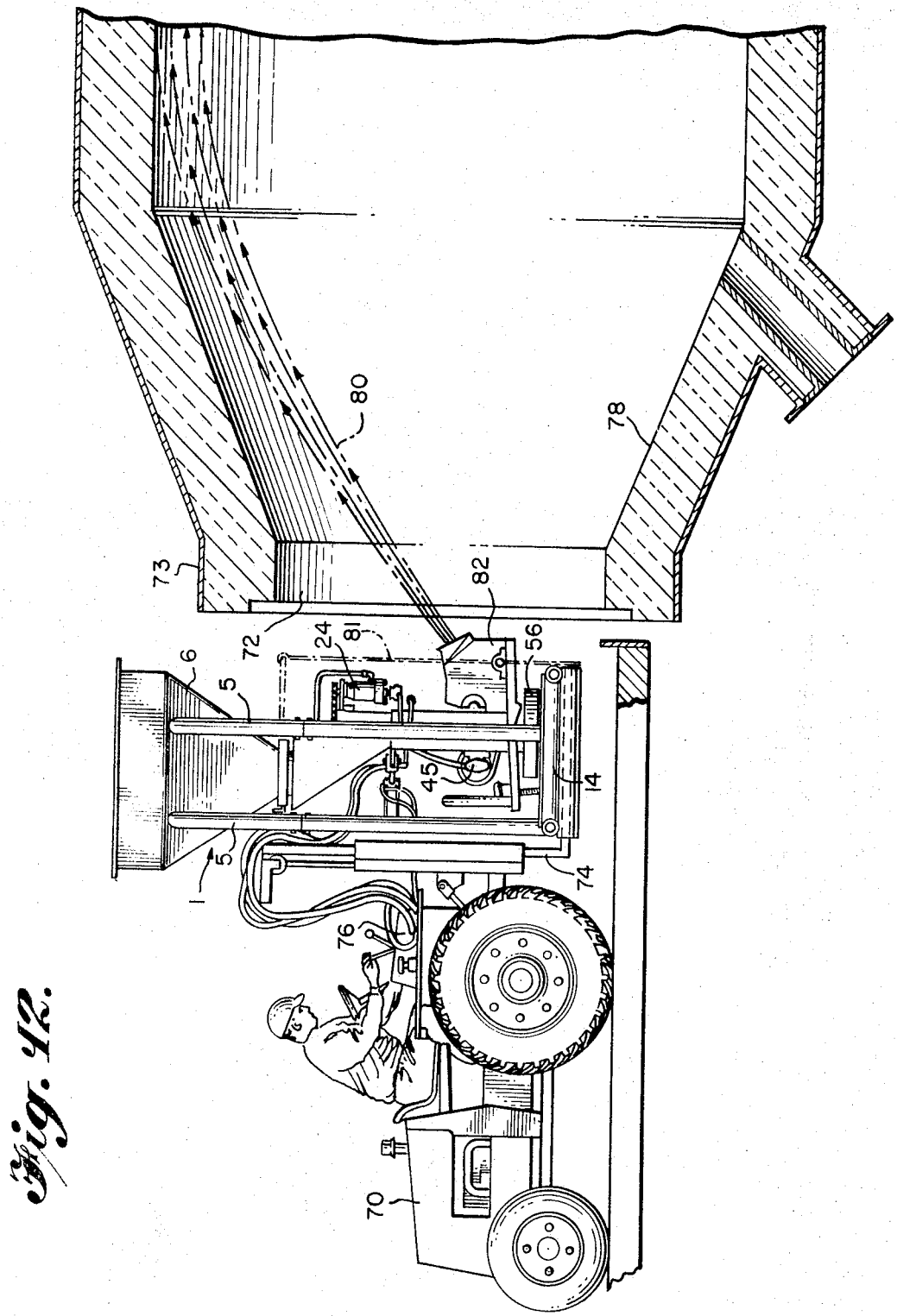

A particularly effective embodiment of the distributing hood is shown in FIGS. 9, 10, and 11. The hood is fitted around the end of the shroud and is shaped so that it tapers inwardly to concentrate the flow of wet particulate material. As shown in FIG. 2, the hood also directs the material onto the center portion of the belt in the selected area or zone 40 so that the material will not fall between the hold-down wheels outside of the selected area.

In accordance with this invention the hood is adjustably mounted on the end of the shroud so that the space between the discharge opening of the hood and the carrying surface of the belt can be varied. This arrangement allows for the usual build-up of material discharged on the belt and also prevents splattering of the material onto the adjacent hold-down wheels or other parts of the apparatus. Generally the hood is spaced from the carrying surface of the belt at a distance of from about one to five inches depending primarily on the diameter of the shroud, the size of the discharge opening in the hood, the feed rate of the screw conveyor and the speed of the belt. This distance is measured approximately along a line that extends perpendicularly from the surface of the belt to the center of the discharge opening in the hood. Usually the hood is adjusted at a pre-set distance that will enable the operator of the apparatus to vary the feed rate and/or the speed of the belt over relatively wide ranges.

The thrower or slinger unit 2 of the apparatus, as shown in FIGS. 1, 2, 3, and 8, is provided with a high speed endless slinger belt 4 having a carrying surface that is held in a concave curve by a pair of hold-down discs or wheels 42 positioned at each side of the belt. The belt tracks over a rear drive roller or pulley 44 and a front idler roll or pulley 46. The drive roller 44 and the pair of hold-down wheels are rotably mounted in bearing journals that are mounted on the vertical support members 47 and 47'.

The idler roll or pulley 46 is rotatably mounted on a tiltable frame member 50. As shown in FIG. 1, the hold-down rollers are positioned in contact with the belt to abruptly change the direction of travel of the belt so that material deposited thereon will be projected in the directions indicated by the arrows. Trajectory of the material is controlled by raising or lowering the front idler roll. This is effected by raising or lowering the handle 52 of the member 50 which is pivotally mounted on support members 47 and 47'. The rear end of member 50 is weighted to counterbalance the weight of the belt and the idler roll so that an operator can easily raise or lower handle 52. The tiltable member 50 may be positioned at a given angle by the wheel and threaded shaft 54. When the member 50 is actuated manually by the operator the shaft 54 will be screwed upwardly so as not to interfere with the tilt adjustment by handle 52. It will be appreciated that the trajectory of the materials projected from the high speed belt is dependent on the angular postion of the member 50 and idler roll 46, the maximum throwing effect usually being obtained when the material is projected at an angle of 30° from a horizontal plane.

As shown in FIGS. 1, 2, 3, and 8, the front portion of distributing hood 38 is positioned between the hold-down discs 42 so that the wet material discharged therefrom will not contact and adhere to the sides of the discs and will be confined to the center portion of the belt 4. In addition, with this arrangement uniform distribution and continuous flow of the wet material are consistently assured and the tendency of the materials to mound up and fall off the sides of the belt and/or to stick to the belt until it has passed over the idler roll and then fall off is substantially eliminated.

Drive roller 44 is driven by a variable speed hydraulic motor 45 which is secured to the adjacent support member 3. This motor, like the hydraulic motor used to drive the conveyor screw, is independently controlled and operated by a valve for regulating the flow of hydraulic fluid. The valve may be located on a centrally located control board or on the control panel shown on the fork-lift truck in FIG. 12. It will be appreciated that appropriate valve control means may be employed to correlate the speed of the belt with the speed of the screw conveyor. In general the speed of the conveyor is set to a desired feed rate and the speed of the belt is varied by the operator during the coating operation to change the projected distance of the material. During this operation a layer of wet material of from about ¼ to 1 inch thickness is applied to the moving belt. The belt which may vary from 5 to 24 inches in width and have a smooth to a relatively rough carrying surface may be operated at speeds of from about 1000 to about 4000 feet per minute. At these speeds the thrower unit will apply from about 500 to about 3000 pounds of materials, based on the weight of dry material, per minute.

Support members 47 and 47' are secured by welding or other appropriate means to a circular support member 56 which is rotably mounted by a center pin and four wheels on frame member 14. Depending upon the manner in which the apparatus is to be used, the rotatable member 56 may be caused to rotate by the operator effecting movement of handle 52 or may be secured by pins in a set position with the thrower unit positioned to project material in a given direction. In the embodiment shown in the drawings, a hydraulically operated piston 60 is secured to a plate 62 connected to the vertical support members 47 and 47' to one of the rear tubular support members 3 by pivotal linkages. Upon being actuated the piston will cause the thrower unit and the integrally associated feed hopper and feed metering and mixing means to rotate through an angle of approximately 90° on the pallet-like frame member, which remains stationary. As shown in the embodiment of the invention illustrated in FIG. 12, the hydraulic fluid for actuating the piston may be controlled by valves located on the control panel of the fork-lift truck.

Operation of the apparatus and method of the invention will be further described with reference to FIG. 12, which illustrates use of the apparatus and method in the repair of the lining of a metallurgical furnace such as a basic oxygen furnace by coating with wet refractory materials. In this case the pallet-like frame 14 of the apparatus is mounted on the front of a fork-lift truck 70 which can be moved to a position on the floor adjacent to the charge opening 72 of the furnace 73. In this embodiment, the tiltable member is usually set by threaded shaft 54 to obtain the maximum throwing effect. The truck is provided with a lifting mechanism 74 that can be vertically raised or lowered and also tilted forward or backward at an angle to the horizontal so that the apparatus can be supported at different positions in front of the charge opening.

The controls, i.e., the valves for regulating the flow of hydraulic fluids to motors 24 and 45 and piston 60 and for regulating the amount of water introduced through injector 12, are mounted on a control panel 76 positioned on the truck in front of the operator. The hydraulic fluid source may be mounted on the truck or positioned to one side on the floor. The water will usually be supplied via an outlet positioned adjacent to and coupled with the valve control on the truck. In order to coat the lining 78 of the furnace 73 with wet refractory from the apparatus, the following start-up procedure is followed:

1. Motor 45 is actuated to start belt 4 in motion and to allow the belt to obtain a preselected speed, depending on the distance the wet refractory is to be thrown, e.g., 1000 ft/minute for a throwing distance of 10 feet.
2. The valve controlling the water to the injector is turned on to feed at a relatively low rate, e.g., 10 gal/minute and the final rate adjusted to suit the demand, based on the rate of feed of the dry refractory and the water content desired in the wet refractory material. Usually the amount of water injected will vary from about 10 to about 30 gallons per minute.
3. Motor 24 is actuated with its control valve being pre-set to a speed at which the conveyor screw will deliver refractory materials at the desired rate of application, e.g., a 6-inch standard pitch screw will be rotated at 90 rpm for application of 500 pounds of the dry material per minute.

The wet granular refractory material is then projected in the form of a continuous arcuate ribbon 80, the width of which is dependent on the width of the zone 40 located between the hold-down discs 42 on the belt. During application of the wet refractory the operator manipulates the controls of the fork-lift to raise or lower the apparatus to vary the trajectory of the ribbon of wet material. Also the operator can actuate the piston 60 to cause rotation of the apparatus and can vary the speed of the belt to increase or decrease the projected distance of the wet material. In this manner different areas of the furnace lining, i.e., close to the charge opening, the pad area, the knuckle, or the bottom of the furnace, may be covered. After the necessary amount of dry refractory has been taken from hoppers 6 and 8, passed downwardly through screw conveyor 10, mixed with water in the conveyor, discharged onto the belt and projected onto the lining 78 to provide a protective coating and make the required repairs, the apparatus is shut down by reversing the start-up procedure.

It will be appreciated that various protective devices may also be employed with the apparatus to facilitate its use in front of the charge opening of an operating metallurgical furnace. For example, in the embodiment shown in FIG. 12, a heat screen 81 with an opening for the projected material is provided in front of the apparatus to shield the operator from the intense heat radiation emanating from the furnace. Also a housing 82 may be fitted over the front end of the thrower unit to deflect any material that might fall from the belt or be projected to the sides.

The invention may be further understood by a refence to the following example:

EXAMPLE

By using the embodiment of the apparatus illustrated in FIGS. 1, 4, and 12, three 3000-pound batches of different mixes of magnesite-containing refractory materials are mixed with water and are applied onto surfaces at distances of from 30 to 45 feet. The apparatus employs a screw conveyor having a shroud with a 6½ inch internal diameter and a conveyor screw having a 6 inch standard pitch double flight with one of the flights being removed in the mixing zone, and provided with paddle mixers as shown in FIG. 4. The inlets of the nozzles of the water injector are positioned approximately 14 inches from the bottom of the shroud and the holddown discs of the thrower unit are spaced approximately 5½ inches apart.

By following the start-up and operating procedure heretofore described, the first batch is applied in a delivery time of one minute and 40 seconds at a rate of 1800 pounds per minute. During this run the water setting for the injector is set at 20 gallons per minute. In the second batch, the delivery time is one minute and 45 seconds, and the rate is 1775 pounds of dry refractory per minute. A water setting of 17 gallons per minute is used. In the third batch the delivery time is one minute and 30 seconds and 2000 pounds of the dry refractory are applied per minute at a water setting of 17 gallons per minute. In each of these batch runs metering and mixing of the refractory materials with the water provide a uniform blend of wet refractories that is continuously distributed onto the belt without any blocking of the shroud or hood. The rate controls are excellent in that the high rates are maintained over the delivery period. Also surfaces at distances of 30 to 45 feet are accurately covered with little fall-out of material from the arcuate ribbon of projected material.

From the above data it will be appreciated that this invention provides a reliable apparatus and method for applying wet, particulate materials, especially wet refractories, at very high rates over considerable distances to form uniform protective coatings on the surface being coated.

It will further be appreciated that in accordance with this invention the tendency of the wet, particulate materials to stick to and/or clog the apparatus is avoided by directly feeding the particulate materials in a dry form from the feed hopper to the positive feed screw conveyor, by mixing water in an intermediate mixing zone within the positive feed conveyor, and by discharging the resultant wet, particulate material onto a selected area of the slinger belt.

Moreover, it will also be appreciated that the dry particulate materials suitable for the purposes of this invention which may contain bound water, i.e., water of hydration and adsorbed water, may also contain relatively small amounts of surface or unbound water so long as the materials will freely pass to the loading zone of the screw conveyor by gravity feed from a hopper or similar storage means.

What is claimed is:

1. An apparatus for rapidly coating a distant surface with wet, particulate material, which comprises thrower means having a high speed endless slinger belt for projecting wet, particulate material at a high rate and in the form of a continuous ribbon onto a distant surface, storage means for storing dry, particulate material, and feed metering and mixing means for successively and continuously metering the dry material from the storage means, mixing a predetermined amount of liquid with the metered dry material to form wet, particulate material and for discharging the wet, particulate material at said high rate onto a selected area of said endless belt.

2. The apparatus of claim 1 in which said feed metering and mixing means comprises a first metering zone having conveyor means for compacting and metering the dry material; a mixing zone, adjacent to said first metering zone, having means for injecting liquid into said particulate material and means for mixing the liquid and metered particulate material to form said wet, particulate material; and a second metering zone, adjacent to the mixing zone, having conveyor means for compacting, metering and discharging the wet, particulate material onto said belt; the compacted material and the conveyor means in said metering zones acting to prevent escape of liquid from the mixing zone to thereby insure that the liquid and particulate material are uniformly mixed before being discharged onto said belt.

3. The apparatus of claim 1 in which said feed metering and mixing means comprises a screw conveyor for metering dry material from said storage means to said belt, said conveyor extending from the storage means to a position over the selected area on said belt, an injector device for injecting liquid into the screw conveyor, and mixing means in said screw conveyor for mixing the liquid and dry, particulate material during the metering of said material.

4. The apparatus of claim 3 in which a distributing hood is mounted on one end of the screw conveyor for directing the wet, particulate material onto said selected area of the belt.

5. The apparatus of claim 3 in which said conveyor has a conveyor screw rotatably mounted within a cylindrical shroud and said mixing means are secured to said conveyor screw.

6. The apparatus of claim 5 in which the injector device comprises a liquid distributing manifold interconnecting a plurality of nozzles that inject liquid into the shroud, and said mixing means comprises a plurality of paddle-like members.

7. The apparatus of claim 5 in which the conveyor screw has a hollow shaft and said injector device comprises conduit means for passing liquid through said shaft and a plurality of nozzles connected to said shaft for injecting the liquid into said shroud, each of said nozzles extending from said shaft a sufficient distance into said material to act as mixing means during rotation of said shaft.

8. The apparatus of claim 4 in which said thrower means also comprise a rear drive roller, a front idler roll and a pair of spaced hold-down discs positioned therebetween, said endless belt being arranged to track over the drive roller and the idler roll and to be held in a concave curve by said holddown discs, the selected area on said belt being approximately shaped like a rectangle, two parallel sides of which are defined by the spacing between the hold-down discs and the other parallel sides of which are defined by the tangential lines of contact of the drive roller and the hold-down discs with the belt.

9. A transportable apparatus for applying wet, granular refractory material at high rates to the hot lining of a metallurgical furnace, comprising an integral unit consisting of a pallet-like frame; thrower means supported by the frame, the thrower means having an endless slinger belt capable of traveling at high speeds and of projecting wet, granular refractory material deposited thereon at a high rate for long distances; a feed hopper for storing dry, granular refractory material; a vertically extending screw conveyor for removing metered amounts of the dry, refractory material from said feed hopper, the loading end of the conveyor being positioned in the bottom of said feed hopper and the discharge end of the conveyor being positioned immediately above the endless belt; injector means for injecting water into the dry material being conveyed through said screw conveyor at a predetermined distance above the discharge end; and mixing means in said conveyor for mixing the water and the dry, refractory material during rotation of the conveyor to form a uniform mixture of wet, refractory material which is then metered by the conveyor onto the endless belt at said high rate; the screw conveyor and the hopper being supported by said frame whereby said apparatus can be transported and positioned as a unit in front of an opening in the wall of a metallurgical furnace to project the wet, refractory material through the opening onto the lining of the furnace.

10. The apparatus of claim 9 in which said screw conveyor has a speed control means for regulating its speed of rotation; said injector means has valve control means for regulating the amount of water injected into said dry material; and said thrower means has a first directional control means for changing the lateral direction in which the material is projected from the belt, a speed control means for varying the speed of the belt, and a second directional control means for varying the trajectory of the material projected from said belt whereby said apparatus can be controlled by an operator in front of said opening to apply the wet, refractory material at varying high rates of application onto different areas of said lining.

11. The apparatus of claim 10, in combination with a fork-lift truck, said apparatus being mounted on the lift mechanism of said fork-lift truck; said second directional control means being set to project the material at a particular trajectory and the other control means of said apparatus being mounted on a master control panel located on said truck; said master control panel also including control means for actuating the lift mechanism of said truck so that said apparatus can be raised or lowered, and tilted forwards and backwards, whereby the operator of the fork-lift truck can position the apparatus in front of the opening of the furnace and can regulate said control means to apply varying high rates of material onto different surface areas on the lining of said furnace.

* * * * *

UNITED STATES PATENT OFFICE
CERTIFICATE OF CORRECTION

Patent No. 3,760,933  Dated Sept. 25, 1973

Inventor(s) Lewis Fritts Maldeis et al

It is certified that error appears in the above-identified patent and that said Letters Patent are hereby corrected as shown below:

Column 1, line 16 - "powered" should be -- powdered --;

line 46 - "mount" should be -- mound --;

line 48 - "tned" should be -- tend --;

line 54 - "to the" should be -- and/or --;

line 56 - "after "belt." the words "the slurry-like" should be omitted.

Column 2, line 10, before "slender" insert -- long --;

line 23, before "furnace" insert -- the --;

line 31, "siurry-like" should be -- slurry-like --.

Column 3, line 8, "botom" should be -- bottom --.

Column 4, line 5, "liguid" should be -- liquid --;

line 20, "particualte" should be -- particulate --.

Column 5, line 6, "onthe" should be -- on the --;

line 45, "pallel-like" should be -- pallet-like --;

line 56, "fork-like" should be -- fork-lift --.

UNITED STATES PATENT OFFICE
CERTIFICATE OF CORRECTION

Patent No. 3,760,933                         Dated Sept. 25, 1973

Inventor(s) Lewis Fritts Maldeis et al

It is certified that error appears in the above-identified patent and that said Letters Patent are hereby corrected as shown below:

Column 6, line 66, "Examplary" should be -- Exemplary --.

Column 7, line 2, after "soil" insert a comma (,);

line 31, "FIG." should be -- FIGS. --.

Column 9, line 4, "the" (first occurrence) should be -- and --;

line 27, "ad" should be -- and --;

lines 45-46, "hoppper" should be -- hopper --.

Column 10, line 60, "FIG." should be -- FIGS. --.

Column 16, line 14, "holddown" should be -- hold-down --.

Signed and sealed this 9th day of April 1974.

(SEAL)
Attest:

EDWARD M. FLETCHER, JR.
Attesting Officer

C. MARSHALL DANN
Commissioner of Patents